US009289840B1

(12) United States Patent
Jacobs

(10) Patent No.: US 9,289,840 B1
(45) Date of Patent: Mar. 22, 2016

(54) WAX SHAPING TOOL HEATING ASSEMBLY

(76) Inventor: Laura B. Jacobs, Shreveport, LA (US)

( * ) Notice: Subject to any disclaimer, the term of this patent is extended or adjusted under 35 U.S.C. 154(b) by 1371 days.

(21) Appl. No.: 12/924,110

(22) Filed: Sep. 21, 2010

Related U.S. Application Data

(60) Provisional application No. 61/277,314, filed on Sep. 23, 2009.

(51) Int. Cl.
| | |
|---|---|
| *B23K 3/04* | (2006.01) |
| *B23K 3/02* | (2006.01) |
| *F23D 14/04* | (2006.01) |
| *F23D 14/08* | (2006.01) |
| *F23D 14/10* | (2006.01) |
| *A47J 33/00* | (2006.01) |
| *A47J 36/24* | (2006.01) |

(52) U.S. Cl.
CPC .............. *B23K 3/027* (2013.01); *B23K 3/043* (2013.01); *F23D 14/04* (2013.01); *A47J 33/00* (2013.01); *A47J 36/2477* (2013.01); *B23K 3/021* (2013.01)

(58) Field of Classification Search
CPC .......... B23K 3/027; B23K 3/043; B23K 3/08; B23K 3/021; A47J 33/00; A47J 36/34; A47J 36/36; A47J 36/2477; A47J 36/2483; F23D 14/04
USPC ............. 126/236, 413, 405, 402, 408, 30, 29, 126/9 B, 9 R; 211/70.6, 66; 248/117.2, 688, 248/682, 692, 676, 121, 176.2, 117.7, 37.3; 269/43, 45, 71, 47
IPC ...... B23K 3/04, 3/02; A47J 33/00; F23D 14/08, F23D 14/10
See application file for complete search history.

(56) References Cited

U.S. PATENT DOCUMENTS

| | | | | |
|---|---|---|---|---|
| 14,892 | A | * | 5/1856 | Wilson ........................... 126/236 |
| 46,527 | A | * | 2/1865 | Leland ............................ 126/237 |
| 200,875 | A | * | 3/1878 | Robinson ........................ 126/237 |
| 258,779 | A | * | 5/1882 | Lockwood ....................... 126/236 |
| 406,310 | A | * | 7/1889 | Sanger ............................ 126/237 |
| 419,058 | A | * | 1/1890 | Nehring .......................... 126/241 |
| 511,433 | A | * | 12/1893 | Johnson ......................... 239/407 |
| 585,641 | A | * | 6/1897 | Dupee ............................ 126/239 |
| 613,745 | A | * | 11/1898 | Weibel ............................ 126/9 R |
| 667,214 | A | * | 2/1901 | Gheen ............................ 126/236 |
| 682,463 | A | * | 9/1901 | Gheen ............................ 126/237 |
| 703,567 | A | * | 7/1902 | France ............................ 126/402 |
| 1,092,725 | A | * | 4/1914 | Leitner .......................... 126/236 |
| 1,180,735 | A | * | 4/1916 | Murray .......................... 126/229 |
| 1,246,760 | A | * | 11/1917 | Lane et al. ...................... 431/283 |
| 1,321,678 | A | * | 11/1919 | Skinner ......................... 126/59.5 |
| 1,342,072 | A | * | 6/1920 | Taylor ........................... 126/59.5 |
| 1,354,065 | A | * | 9/1920 | Pruessing et al. ............. 126/236 |
| 1,401,514 | A | * | 12/1921 | Blake ..................... B23K 3/027 126/237 |
| 1,415,098 | A | * | 5/1922 | Klein ............................. 126/236 |

(Continued)

FOREIGN PATENT DOCUMENTS

| | | | | |
|---|---|---|---|---|
| DE | 3519010 C1 | * | 11/1986 | ............. B23K 3/027 |
| EP | 2181794 A1 | * | 5/2010 | ............. B23K 3/027 |

(Continued)

*Primary Examiner* — Gregory Huson
*Assistant Examiner* — Daniel E Namay
(74) *Attorney, Agent, or Firm* — R. Keith Harrison

(57) ABSTRACT

A wax shaping tool heating assembly includes a tool holder having a tool holder base, a heat source housing having a housing interior carried by the tool holder base and a tool holder bracket carried by the heat source housing.

13 Claims, 2 Drawing Sheets

(56) References Cited

U.S. PATENT DOCUMENTS

| | | | | |
|---|---|---|---|---|
| 1,415,890 A * | 5/1922 | Meikle | 126/239 |
| 1,432,801 A * | 10/1922 | Streit | 126/237 |
| 1,437,739 A * | 12/1922 | Vernon | F24B 1/202 |
| | | | 126/29 |
| 1,497,104 A * | 6/1924 | Lamb | 126/236 |
| 1,697,966 A * | 1/1929 | Rubel | 126/229 |
| 1,760,868 A * | 6/1930 | Blaskewitz | 126/236 |
| 1,770,566 A * | 7/1930 | Blaskewitz | 126/240 |
| 1,786,065 A * | 12/1930 | Heimberger et al. | 165/80.1 |
| 2,035,223 A * | 3/1936 | Davidson | 126/77 |
| 2,543,781 A * | 3/1951 | Jurgens | A01K 11/005 |
| | | | 126/229 |
| 2,559,317 A * | 7/1951 | Perlstein | 248/125.1 |
| 2,560,228 A * | 7/1951 | Kosorok | 220/697 |
| 2,637,315 A * | 5/1953 | Staggs | A01K 11/005 |
| | | | 126/229 |
| 2,726,655 A * | 12/1955 | Resseguie | 126/229 |
| 2,764,146 A * | 9/1956 | Roybal | 126/231 |
| 2,822,801 A * | 2/1958 | Bissell | A01K 11/005 |
| | | | 126/229 |
| 3,154,065 A * | 10/1964 | Bencoe | A47J 37/0713 |
| | | | 126/260 |
| 3,185,311 A * | 5/1965 | Roberts et al. | 211/66 |
| 3,215,815 A * | 11/1965 | Lerner | 219/242 |
| 3,327,981 A * | 6/1967 | Yates | 248/117.2 |
| 3,724,444 A * | 4/1973 | Varona | B23K 3/027 |
| | | | 126/237 |
| 4,340,029 A * | 7/1982 | Kelly, Jr. | B23K 3/027 |
| | | | 126/237 |
| 4,721,225 A * | 1/1988 | Sobel | 220/736 |
| 5,685,288 A * | 11/1997 | Sibley et al. | 126/229 |
| 5,915,371 A * | 6/1999 | Hering | F24C 1/16 |
| | | | 126/30 |
| 6,553,984 B1 * | 4/2003 | Thomas | 126/29 |
| 6,851,419 B2 * | 2/2005 | Reiner | F24C 1/16 |
| | | | 126/40 |
| 7,137,584 B2 * | 11/2006 | Wong | 242/171 |
| 7,731,074 B2 * | 6/2010 | Martin | B23K 3/022 |
| | | | 228/51 |
| 2006/0249139 A1 * | 11/2006 | Alongi | A47J 37/079 |
| | | | 126/30 |

FOREIGN PATENT DOCUMENTS

| | | | | |
|---|---|---|---|---|
| FR | 2574273 A1 * | 6/1986 | | A47G 21/14 |
| GB | 220654 A * | 7/1925 | | B23K 3/027 |
| GB | 2107970 A * | 5/1983 | | A47J 36/36 |
| WO | WO 2006066221 A2 * | 6/2006 | | B23K 3/027 |

* cited by examiner

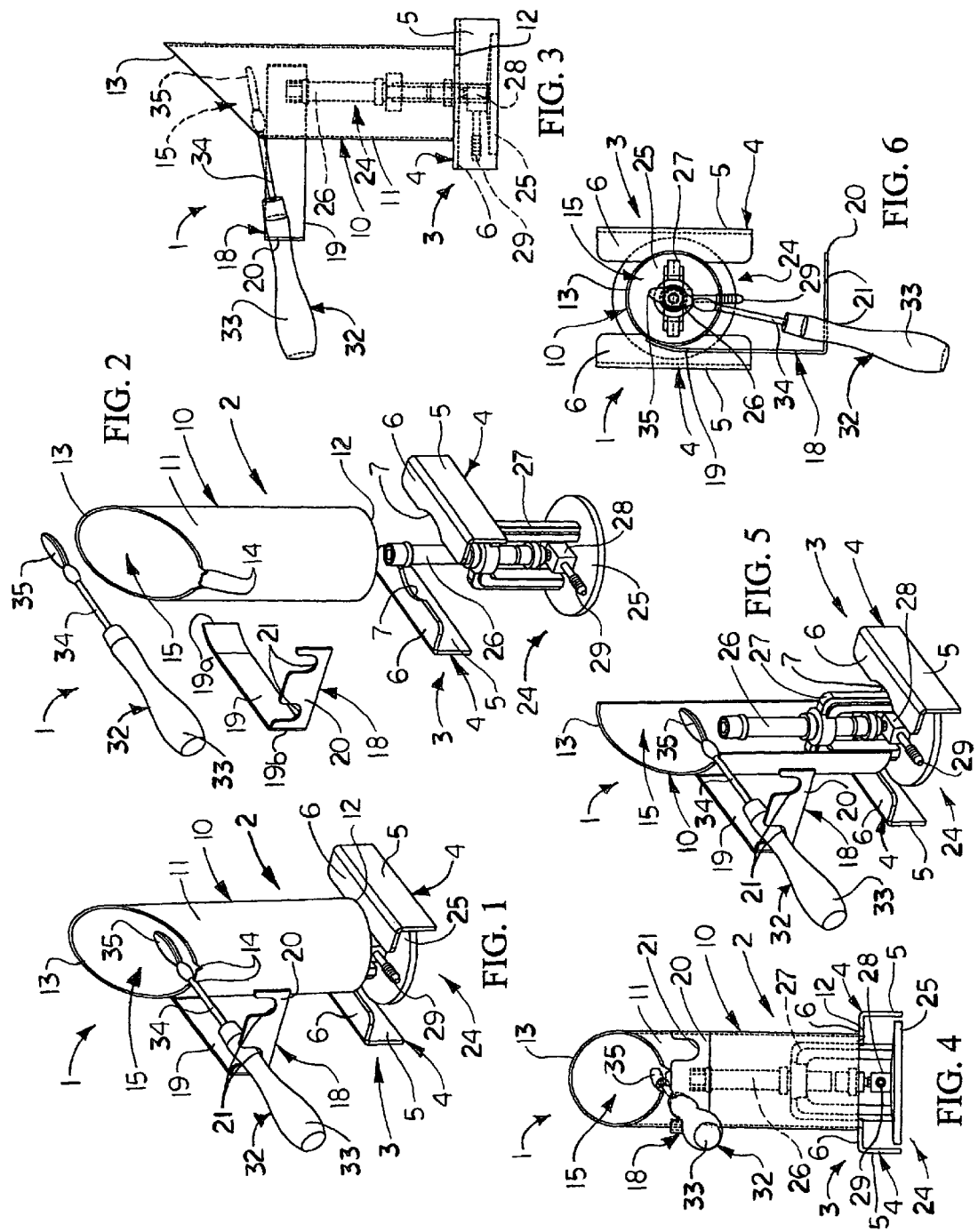

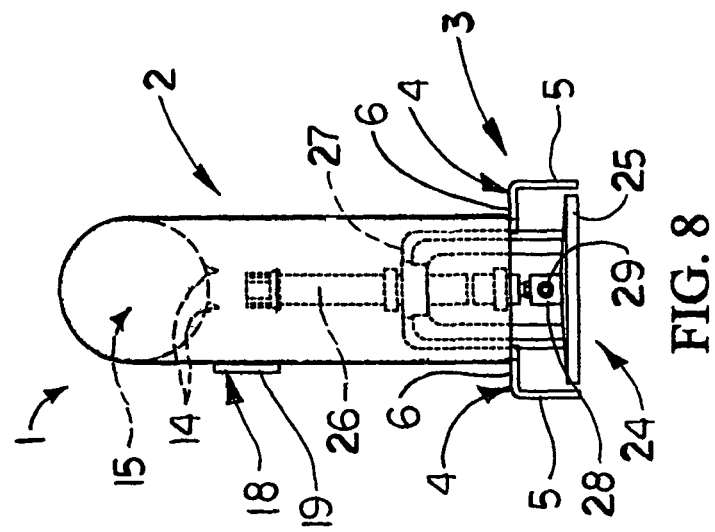
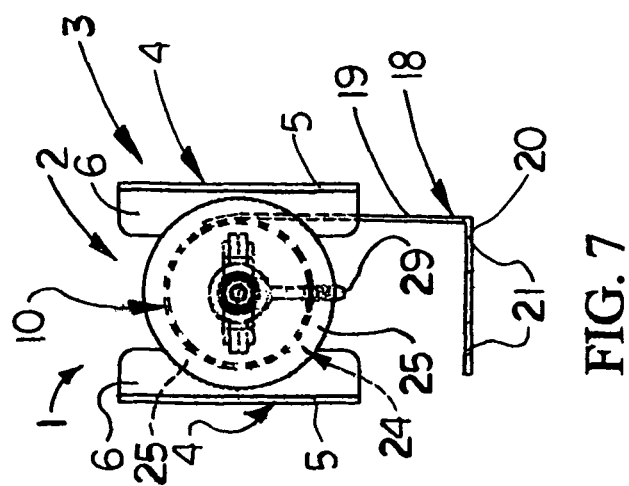

WAX SHAPING TOOL HEATING ASSEMBLY

CROSS-REFERENCE TO RELATED APPLICATIONS

This application claims the benefit of and incorporates by reference in its entirety U.S. provisional application No. 61/277,314, filed Sep. 23, 2009 and entitled "WAX SHAPING TOOL HEATING ASSEMBLY".

FIELD

The present disclosure generally relates to heating devices for tools used to melt or soften and shape wax on a dental cast in the fabrication of dental prosthetics such as dentures. More particularly, the present disclosure relates to a wax shaping tool heating assembly which is simple in design and easy to use.

BACKGROUND

Dental prosthetics such as dentures may be fabricated by initially taking impressions of a patient's edentulous maxillary and mandibular arches. The impressions are used as molds into which a cast material such as gypsum is subsequently poured to form dental casts that are duplicates of the patient's maxillary and mandibular arches. The dental casts serve as a model for the dental prosthesis which is to be fabricated.

The dental casts which form the model for fabrication of the prosthesis may be mounted in a dental articulator to maintain the maxillary and mandibular portions of the casts in the same anatomical relationship as the maxilla and the mandible, respectively, in the mouth of the patient. Additionally, placement of the dental casts into the dental articulator may permit arrangement of the individual teeth of the dentures into their proper positions for occlusion. The individual teeth of the dentures may then be set in wax which is applied over the dental casts.

After it is placed on the dental casts to set the teeth of the dentures, the wax may be melted or softened and shaped by applying a heated wax shaping tool to the wax. The wax shaping tool, commonly known as a "waxing iron", may be heated by placing the tool over the flame of a Bunsen burner or over some other heat source. Conventional methods of holding the tool over the heat source include placement of the heat source inside a coffee can the bottom of which has been cut out. The wax shaping tool is supported on the edge of the coffee can and placed over the heat source. Other methods include supporting the tool over the open flame of a Bunsen burner using a wire hanger. After the wax is placed on the dental casts, the heated wax shaping tool is removed from the heat source and applied to the wax to melt or soften the wax and shape the wax to set the teeth on the dental casts.

One of the drawbacks of the conventional method of holding the wax shaping tool over a heat source is that the coffee can, wire hanger or other support is not well-suited to holding the wax shaping tool over the heat source. Furthermore, an open flame of the Bunsen burner or other heat source may pose a fire hazard. Therefore, a wax shaping tool heating assembly which is simple in design and easy to use is needed.

SUMMARY

The present disclosure is generally directed to a wax shaping tool heating assembly. An illustrative embodiment of the assembly includes a tool holder having a tool holder base, a heat source housing having a housing interior carried by the tool holder base and a tool holder bracket carried by the heat source housing.

In some embodiments, the wax shaping tool heating assembly may include a tool holder having a tool holder base and a heat source housing having a housing interior carried by the tool holder base. A heat source is provided in the housing interior of the heat source housing.

In some embodiments, the wax shaping tool heating assembly may include a tool holder having a tool holder base with a pair of generally elongated, parallel, spaced-apart base brackets and a pair of generally curved base notches in the base brackets, respectively; and a heat source housing having a generally elongated, cylindrical housing wall with a circular first edge carried by the tool holder base and generally coinciding in shape with the base notches in the base brackets, respectively, a generally elliptical second edge spaced-apart and disposed at an acute angle with respect to the first edge and at least one tool notch in the second edge; a tool holder bracket having a generally elongated bracket arm carried by the housing wall of the heat source housing, a bracket flange carried by the bracket arm and at least one tool notch in the bracket flange in spaced-apart relationship with respect to the at least one tool notch in the second edge. A heat source is provided in the housing interior of the heat source housing.

BRIEF DESCRIPTION OF THE DRAWINGS

The disclosure will now be made, by way of example, with reference to the accompanying drawings, in which:

FIG. 1 is a front perspective view of an illustrative embodiment of the wax shaping tool heating assembly;

FIG. 2 is an exploded front perspective view of an illustrative embodiment of the wax shaping tool heating assembly;

FIG. 3 is a left side view of an illustrative embodiment of the wax shaping tool heating assembly;

FIG. 4 is a front view of an illustrative embodiment of the wax shaping tool heating assembly;

FIG. 5 is a front perspective view, partially in section, of an illustrative embodiment of the wax shaping tool heating assembly;

FIG. 6 is a top view of an illustrative embodiment of the wax shaping tool heating assembly;

FIG. 7 is a bottom view of an illustrative embodiment of the wax shaping tool heating assembly, with the wax shaping tool removed from the tool holder of the assembly; and FIG. 8 is a rear view of an illustrative embodiment of the wax shaping tool heating assembly, with the wax shaping tool removed from the tool holder of the assembly.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the invention and are not intended to limit the scope of the invention which is defined by the claims. Furthermore, there is no intention to be bound by any expressed or implied theory presented in the preceding technical field, background, brief summary or the following detailed description.

Referring to the drawings, an illustrative embodiment of the wax shaping tool heating assembly, hereinafter assembly, is generally indicated by reference numeral 1. The assembly 1 includes a tool holder 2 which may be metal or a heat-resistant plastic or other material. The tool holder 2 may include a tool holder base 3 and a heat source housing 10 extending from the tool holder base 3. The heat source housing 10 of the tool holder 2 may be adapted to contain a heat source 24 such as a Bunsen burner, for example and without limitation. A tool holder bracket 18 may be provided on the heat source housing 10. The tool holder bracket 18 and the heat source housing 10 may be adapted to support at least one wax shaping tool 32 to facilitate heating of the wax shaping tool or tools 32 by operation of the heat source 24, for purposes which will be hereinafter described.

The tool holder base 3 of the assembly 1 may have any design which is suitable for supporting the heat source housing 10 and which is consistent with the functional requirements of the assembly 1. In some embodiments, the tool holder base 3 may include a pair of generally elongated, parallel, spaced-apart base brackets 4 each of which may have an L-shaped cross-section with a vertical bracket portion 5 and a horizontal bracket portion 6 extending from the vertical bracket portion 5. As illustrated in FIG. 2, base notches 7 may be provided in the horizontal bracket portions 6 of the respective base brackets 4 in facing relationship with respect to each other for purposes which will be hereinafter described.

The heat source housing 10 of the assembly 1 may have a housing wall 11 which may have a generally elongated, cylindrical shape, as illustrated, and defines a housing interior 15. In other embodiments, the housing wall 11 of the heat source housing 10 may have alternative shapes. The housing wall 11 of the heat source housing 10 may have a housing bottom edge 12 which may be generally circular and engages or rests on the horizontal bracket portions 6 of the respective base brackets 4 of the tool holder base 3. In some embodiments, the housing bottom edge 12 of the housing wall 11 may be welded and/or otherwise attached to the tool holder base 3. In some embodiments, the housing wall 11 of the heat source housing 10 may be fabricated in one piece with the tool holder base 3 using molding, casting or other fabrication techniques known by those skilled in the art. The base notches 7 in the horizontal bracket portions 6 of the respective base brackets 4 may generally coincide in shape with the housing wall 11 of the heat source housing 10.

The housing wall 11 of the heat source housing 10 may have a housing top edge 13 which is spaced-apart from the housing bottom edge 12. In some embodiments, the housing top edge 13 of the housing wall 11 may be generally elliptical and may be disposed in a plane which is oriented at an acute angle with respect to a plane in which the housing bottom edge 12 is disposed, as particularly illustrated in FIG. 3. At least one tool notch 14 may be provided in the housing top edge 13 of the heat source housing 10. In some embodiments, a pair of spaced-apart tool notches 14 may be provided in the housing top edge 13 of the heat source housing 10, as illustrated.

A tool holder bracket 18 may be provided on the heat source housing 10. The tool holder bracket 18 may have any design which is suitable for supporting the wax shaping tool or tools 32 on the heat source housing 10. In some embodiments, the tool holder bracket 18 may include a bracket arm 19 which extends from the housing wall 11 of the heat source housing 10 and a bracket flange 20 which extends from the bracket arm 19. As illustrated in FIG. 2, the bracket arm 19 of the tool holder bracket 18 may have an attachment arm end 19a which is attached to the exterior surface of the housing wall 11 of the heat source housing 10 according to the knowledge of those skilled in the art and a bracket arm end 19b which is opposite the attachment arm end 19a. In some embodiments, the attachment arm end 19a of the bracket arm 19 may be attached to the housing wall 11 of the heat source housing 10 using welding, fasteners and/or other attachment technique. In some embodiments, the attachment arm end 19a may be fabricated in one piece with the housing wall 11 using molding, casting or other fabrication techniques known by those skilled in the art. The bracket flange 20 may be oriented in generally perpendicular relationship with respect to the bracket arm 19 of the tool holder bracket 18. At least one tool notch 21 may be provided in the bracket flange 20 of the tool holder bracket 18. In some embodiments, a pair of tool notches 21 may be provided in the bracket flange 20 for purposes which will be hereinafter described.

The heat source 24 which is provided in the housing interior 15 of the heat source housing 10 of the tool holder 2 may be any source of heat which is suitable for heating the wax shaping tool 32 as it is supported by the heat source housing 10 and the tool holder bracket 18. In some embodiments, the heat source 24 may be a Bunsen burner which may have a conventional design. Accordingly, the Bunsen burner may have a burner base 25; a burner valve 28 provided on the burner base 25; and a burner tube 26 extending from the burner valve 28. A ribbed hose attachment barb (not illustrated) may extend from the burner valve 28 for connection to a gas source (not illustrated) through a connection hose (not illustrated). The burner tube 26 may extend through a tube support bracket 27 provided on the burner base 25. A valve adjustment control 29 may extend from the burner valve 28 to vary the quantity of gas which flows into the burner tube 26 and therefore, the size of the flame (not illustrated) which is emitted from the burner tube 26. When the heat source 24 is placed in the housing interior 15 of the heat source housing 10, the burner tube 26 of the heat source 24 may extend through the base notches 7 provided in the horizontal bracket portions 6 of the respective base brackets 4.

In typical application, the assembly 1 may be used to heat at least one wax shaping tool 32 (commonly known as a "waxing iron") prior to application of the wax shaping tool 32 to wax (not illustrated) which has been placed on a dental cast (not illustrated) to melt or soften the wax in the setting of teeth on the dental cast during the fabrication of dentures or other dental prosthetic device (not illustrated). The wax shaping tool 32 may have a conventional design with a tool handle 33, an elongated tool shaft 34 which extends from the tool handle 33 and a tool blade 35 terminating the tool shaft 34. The heat source 24 is initially placed on a flat support surface (not illustrated) such as a bench or tabletop, for example and without limitation. A gas source (not illustrated) is connected to the heat source 24. A flame (not illustrated) may then be ignited from the burner tube 26 of the heat source 24. The heat source housing 10 of the assembly 1 is placed over the heat source 24 such that the heat source 24 is contained in the housing interior 15 of the heat source housing 10, and the tool holder base 3 is lowered in place onto the support surface.

At least one wax shaping tool 32 is placed on the tool holder bracket 18 with the tool blade 35 of each wax shaping tool 32 positioned over the housing interior 15 of the heat source housing 10. Accordingly, the tool handle 33 of each wax shaping tool 32 may be placed in a corresponding tool notch 21 provided in the bracket flange 20 of the tool holder bracket 18. The tool shaft 34 of each wax shaping tool 32 may be placed in a corresponding tool notch 14 provided in the housing top edge 13 of the housing wall 11 of the heat source housing 10. The heat source 24 in the housing interior 15 of the heat source housing 10 heats the tool blade 35 of the wax shaping tool 32 as the wax shaping tool 32 remains in position on the tool holder bracket 18 and the heat source housing 10. The housing wall 11 of the heat source housing 10 provides a heat shield for the heat source 24.

After the tool blade 35 of the wax shaping tool 32 has remained over the heat source 24 for a determined period of time and therefore has reached a selected temperature which is suitable for melting or softening wax (not illustrated) through contact with the tool blade 35, the wax shaping tool 32 is removed from the tool holder bracket 18 and the heat source housing 10. The tool handle 33 of the wax shaping tool 32 is gripped and the tool blade 35 is applied to the wax (not illustrated) to melt or soften and shape the wax to set the teeth on the dental cast during fabrication of the dentures or other dental prosthetic device (not illustrated). The wax shaping tool 32 may be replaced on the tool holder bracket 18 and the heat source housing 10 as often as is necessary to reheat the tool blade 35 of the wax shaping tool 32. It will be appreciated by those skilled in the art that the assembly 1 is applicable to numerous alternative applications in which it is desired to heat the tool blade 35 of the wax shaping tool 32 for the purpose of heating or softening wax or may be used in any other application in which use of a heated tool is necessary or desired. For example, in some applications, jewelers may use the assembly 1 to heat tools used in the repair of jewelry. It will further be appreciated by those skilled in the art that one of the wax shaping tools 32 may remain on the assembly 1 and heated while the other wax shaping tool 32 is used to shape the wax on the dental casts. This expedient ensures that a heated wax shaping tool 32 is available for shaping the wax at all times.

While various illustrative embodiments have been described above, it will be recognized and understood that various modifications can be made and the appended claims are intended to cover all such modifications which may fall within the spirit and scope of the disclosure.

What is claimed is:

1. A tool holder, comprising:
    a tool holder base;
    an elongated, vertical heat source housing having a continuous and unbroken cylindrical housing wall with a housing interior carried by said tool holder base, a housing top edge and at least one tool notch in said housing top edge; and
    a tool holder bracket carried by said heat source housing and having at least one tool notch spaced-apart from said at least one tool notch in said housing top edge.

2. The tool holder of claim 1 wherein said tool holder base comprises a pair of spaced-apart base brackets.

3. The tool holder of claim 2 wherein each of said base brackets comprises a first bracket portion and a second bracket portion carried by and disposed in generally perpendicular relationship with respect to said first bracket portion, and wherein said heat source housing is carried by said second bracket portion.

4. The tool holder of claim 3 further comprising a base notch provided in said second bracket portion and generally coinciding in shape with said heat source housing.

5. The tool holder of claim 1 wherein said tool holder bracket comprises a bracket arm carried by said heat source housing and a bracket flange carried by said bracket arm.

6. The assembly of claim 1 wherein said heat source housing comprises a generally elongated, cylindrical housing wall defining said housing interior.

7. The assembly of claim 6 wherein said housing wall has a generally circular housing bottom edge carried by said tool holder base and said housing top edge is generally elliptical and spaced-apart and disposed at an acute angle with respect to said housing bottom edge.

8. A wax shaping tool heating assembly, comprising:
    a tool holder comprising:
        a tool holder base; and
        an elongated, vertical heat source housing having a continuous and unbroken cylindrical housing wall with a housing interior carried by said tool holder base, a housing top edge and at least one tool notch in said housing top edge; and
        a tool holder bracket carried by said heat source housing and having a horizontal bracket arm carried by said heat source housing, a horizontal bracket flange carried by and perpendicular to said bracket arm and at least one tool notch provided in said bracket flange spaced-apart from and in alignment with said at least one tool notch in said housing top edge; and
    a heat source provided in said housing interior of said heat source housing.

9. The assembly of claim 8 wherein said heat source comprises a Bunsen burner.

10. The assembly of claim 8 wherein said housing wall has a generally circular housing bottom edge carried by said tool holder base and said housing top edge is generally elliptical and spaced-apart and disposed at an acute angle with respect to said housing bottom edge.

11. A wax shaping tool heating assembly, comprising:
    a tool holder comprising:
        a tool holder base having a pair of generally elongated, parallel, spaced-apart base brackets and a pair of generally curved base notches in said base brackets, respectively; and
        a vertical heat source housing having a generally elongated, continuous and unbroken cylindrical housing wall with a circular housing bottom edge carried by said tool holder base and generally coinciding in shape with said base notches in said base brackets, respectively, a generally elliptical housing top edge spaced-apart and disposed at an acute angle with respect to said housing bottom edge and at least one tool notch in said housing top edge;
        a tool holder bracket having a generally elongated, horizontal bracket arm carried by said housing wall of said heat source housing, a horizontal bracket flange carried by and perpendicular to said bracket arm and at least one tool notch in said bracket flange in spaced-apart and aligned relationship with respect to said at least one tool notch in said housing top edge; and
    a heat source provided in said housing interior of said heat source housing.

12. The assembly of claim 11 wherein said heat source comprises a Bunsen burner.

13. The assembly of claim 11 wherein each of said base brackets comprises a first bracket portion and a second bracket portion carried by and disposed in generally perpendicular relationship with respect to said first bracket portion, and wherein said heat source housing is carried by said second bracket portion.

* * * * *